Figure 1:
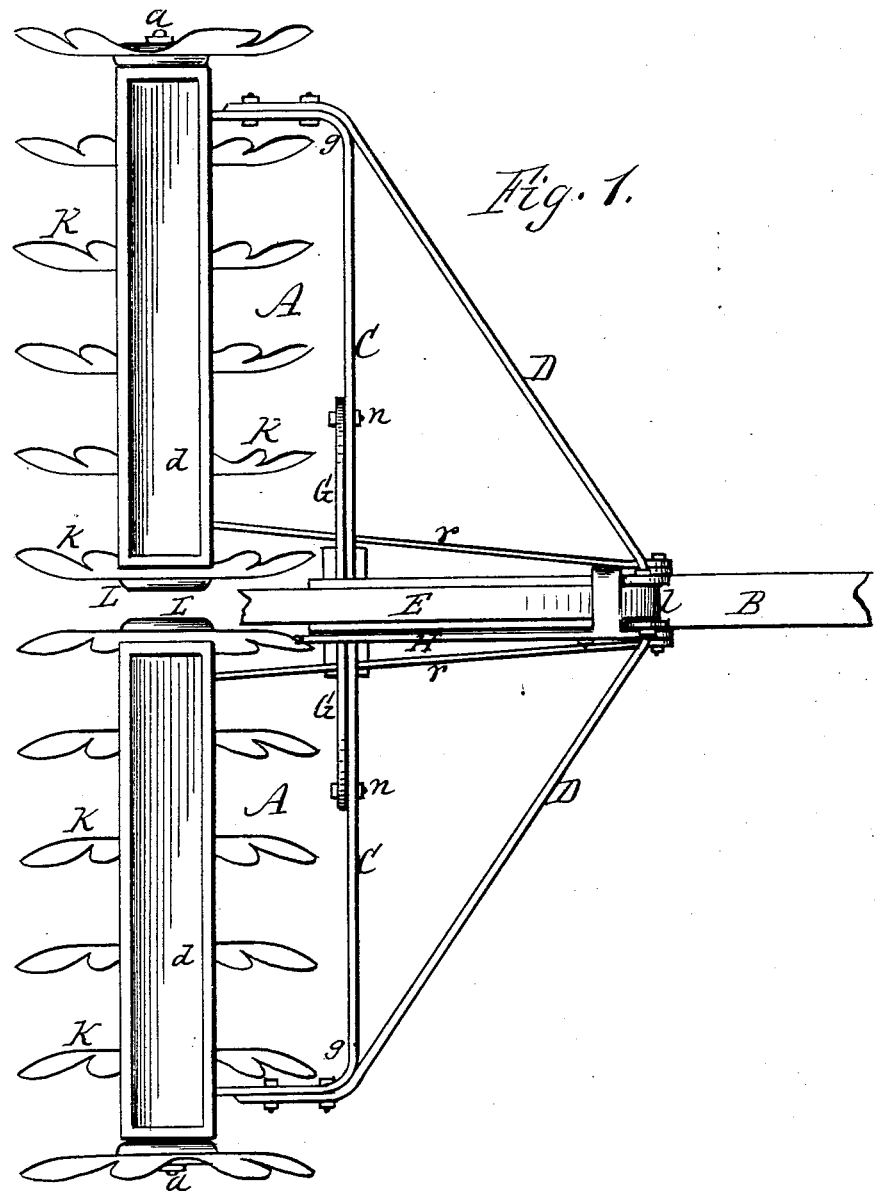

(No Model.) 3 Sheets—Sheet 1.
C. MAUL.
SPADING HARROW.

No. 586,505. Patented July 13, 1897.

Witnesses.
J. B. Culver
J. F. Culver

Inventor.
Christian Maul,
pr R. F. Osgood,
Atty.

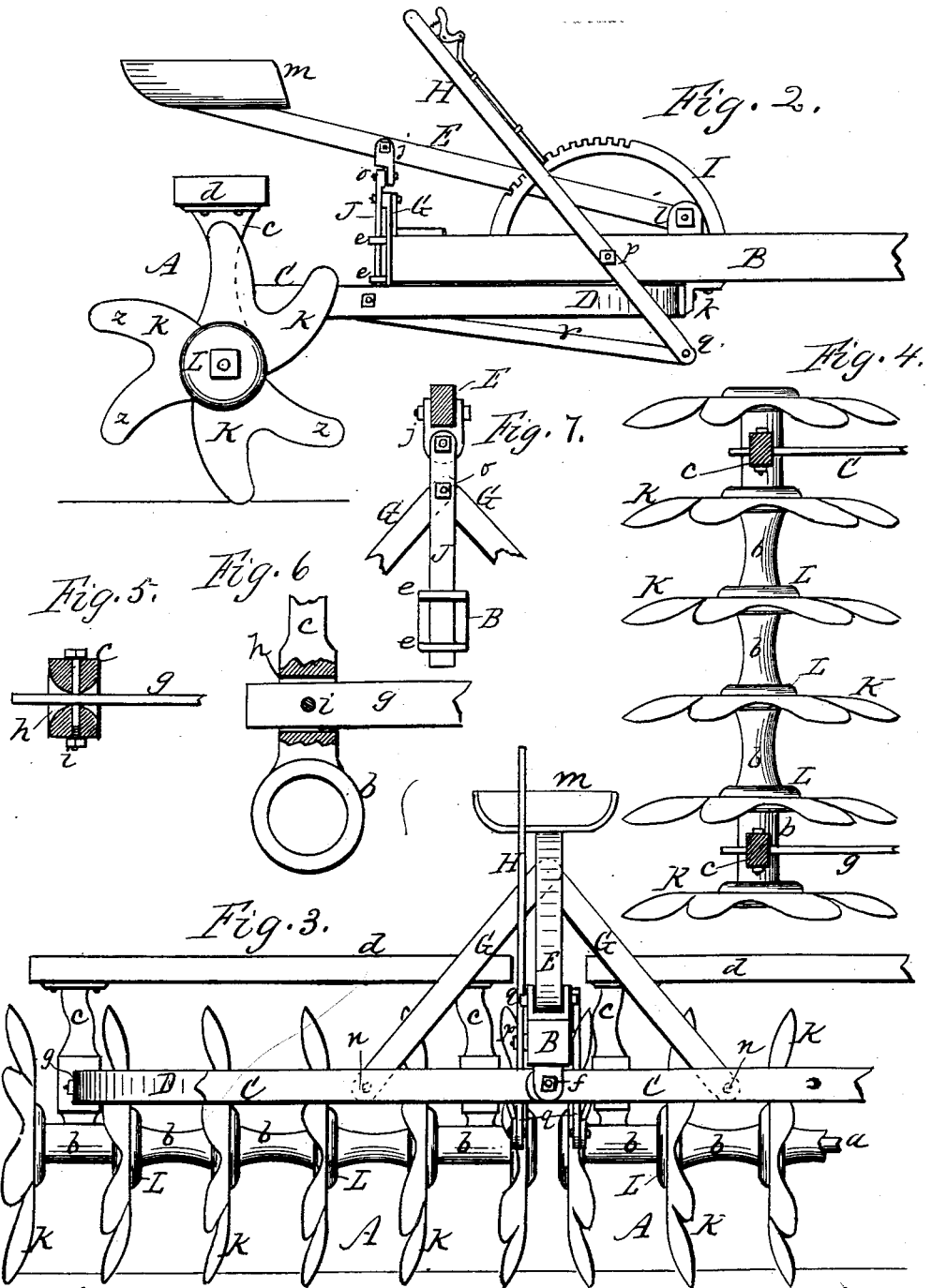

(No Model.)
C. MAUL.
SPADING HARROW.
No. 586,505.
3 Sheets—Sheet 3.
Patented July 13, 1897.
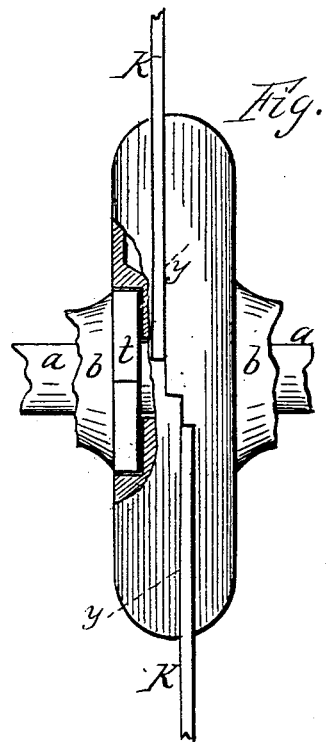
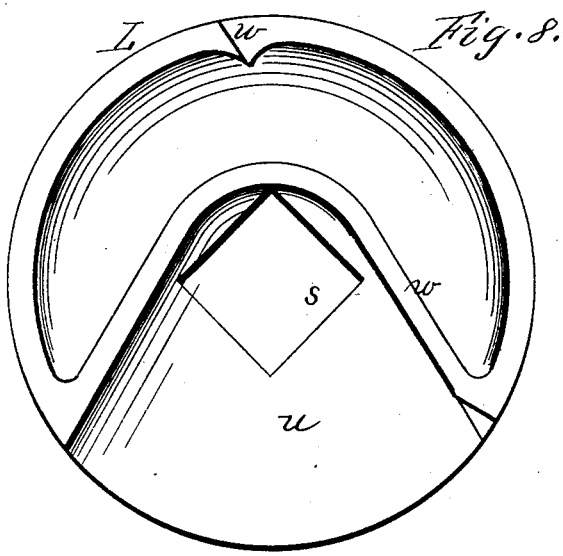
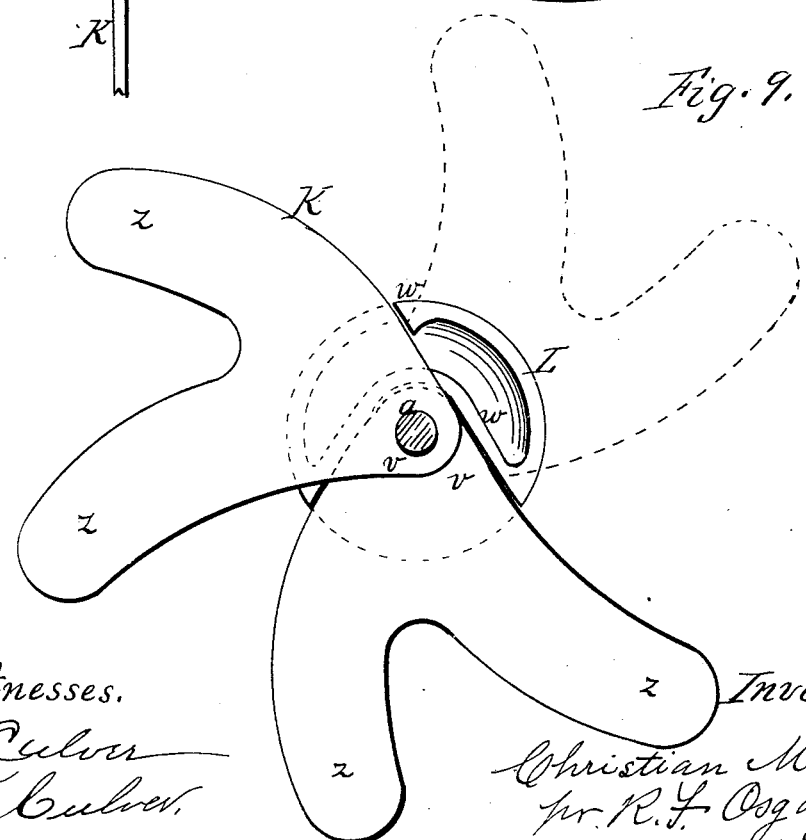
Witnesses.
J. F. Culver
J. F. Culver
Inventor.
Christian Maul,
pr. R. F. Osgood,
Atty.

UNITED STATES PATENT OFFICE.

CHRISTIAN MAUL, OF BROCKPORT, NEW YORK.

SPADING-HARROW.

SPECIFICATION forming part of Letters Patent No. 586,505, dated July 13, 1897.

Application filed October 20, 1894. Serial No. 526,458. (No model.)

*To all whom it may concern:*

Be it known that I, CHRISTIAN MAUL, of Brockport, in the county of Monroe and State of New York, have invented a certain new and useful Improvement in Spading-Harrows; and I do hereby declare that the following is a full, clear, and exact description of the same, reference being had to the drawings accompanying this application.

My improvement relates to that class known as "spading-harrows," in which two gangs of cutting-teeth are arranged on opposite sides of the center of draft and are capable of being operated by the driver so as to cut in a straight line or at an angle.

The invention consists in the construction and arrangement of parts hereinafter described and claimed.

In the drawings, Figure 1 is a plan view of the machine. Fig. 2 is a side elevation. Fig. 3 is a front elevation, a portion of the machine being broken away. Fig. 4 is a plan view of one of the gangs of cutting-teeth. Figs. 5 and 6 are enlarged detail views showing the connection of the bars of the main frame with the standards. Fig. 7 is an enlarged edge view of one of the sets of teeth. Fig. 8 is an inside plan view of one of the clamps of the teeth. Fig. 9 is a diagram showing one of the clamps and two of the teeth fitted thereto, the position of the third tooth being indicated by dotted lines.

A A indicate the two gangs of teeth, and B the draft pole or tongue with which they are connected and by which they are drawn over the ground. Each of these gangs consists of cutter-heads provided with teeth cut from sheet-steel and arranged in sets at definite distances apart. The sets of each gang are all located on an axle $a$ and are separated by washers or spools $b\ b$ and have end standards $c\ c$, which support weight-boxes $d\ d$ and also serve for the connection of the bars of the main frame.

The main frame consists of two front bars C C, pivoted centrally at $f$ to the under side of the pole, the outer ends being curved backward, as shown at $g$, and passing through slots $h\ h$ of the outer standards $c\ c$, to which they are attached by bolts $i\ i$, as shown most clearly in Figs. 5 and 6. The slots are of double-V shape, as shown in Fig. 5, by which means they allow proper side play or swing to the bars laterally as the inner ends of the gangs are thrown backward to stand at an angle to the line of draft.

D D are two braces also pivoted centrally at $k$ to the under side of the pole some distance in advance of the front bars before described, said braces being curved at their outer ends, fitting over the curved ends of the front bars, and attached rigidly to said front bars by bolts.

The side bars and braces form substantially one attachment turning on pivots at their inner ends and by their joint action enable either end of the gangs to rise and fall to accommodate themselves to any incline of the ground at right angles to the line of draft.

In some cases the braces D may be dispensed with, the front bars C C in that case forming the frame.

E is a seat-support consisting of a bar pivoted at $l$ to the pole and having a driver's seat $m$ at the rear end.

J is a bar forming a guide attached at its upper end to a bearing $j$, pivoted to the seat-support, its lower end passing freely through socket-pieces $e\ e$, attached to the rear end of the pole.

G G are supporting-arms standing in $\Lambda$ form, pivoted at their lower ends, at $n\ n$, to the front bars C C and at their upper ends, at $o$, to the guide J. It will be seen that by means of these supporting-arms the seat and its support is sustained at the rear end and that they rise and fall with the rising and falling of the inner ends of the front bars C C, but in the reverse direction. In other words, when the inner ends of the front bars fall, the seat rises, and when said inner ends of the front bars rise the seat falls. The object of this is to retain the seat in substantially a level position or at the same height during the rise and fall of the gangs in passing over inclined or irregular surfaces. The guide J holds the seat in a vertical position at all times, yet allows free up-and-down motion. This arrangement is an essential feature of my invention.

H is an operating-lever pivoted at $p$ to the pole and provided with two forked arms $q\ q$ at its lower end, to which are pivoted connecting-bars $r\ r$, extending back and passing through slots of the inner standards $c\ c$, to which they are bolted in the same manner as the outer ends of the front bars before described. By throwing the lever forward the inner ends of the gangs are thrown backward, so as to stand at an angle to the line of draft, thereby producing a greater cutting or pulverizing action in the soil.

I is a segment or circle plate, notched in its outer edge, with which engages a pawl on the operating-lever to hold the latter in place at any adjustment.

The parts composing the main frame are all made by cutting off lengths from straight bar or strap iron and then bending them into proper shape. The frame can therefore be made cheaper than the ordinary stiff frames now in use.

The construction described has the advantage of allowing almost universal action of the gangs in adapting themselves to the surface of the soil. The gangs can be readily shifted from one side to the other, as they are interchangeable, thus throwing the soil inward instead of outward. The standards $c\,c$ are also interchangeable, so that a single pattern only is required in making the castings. There are a less number of castings than in ordinary machines of the class, whereby the expense is reduced.

Each of the cutter-heads consists of three blades K K K and two clamping-heads L L. (Shown in Figs. 7, 8, and 9.) The clamping-heads are counterparts made from a single pattern, and each consists of a disk having a square central eye $s$, in which fits a corresponding square shoulder $t$ on the end of the washer or spool $b$, by which means when all are clamped together they turn with the axle. In the inner face of each disk is made a sunken seat $u$, of an angular shape, Fig. 8, in which fits the shank $v$ of one of the blades K, which shank fills the space flush with the surface. Above this is placed the shank of the next blade, resting against shoulders $w\,w$, forming a second raised seat, by which it is supported. These two blades are fitted to one of the disks. The third blade, whose position is indicated by the dotted lines in Fig. 9, is fitted in a seat of the other disk, similar in shape to the seat $u$. When the two disks are placed face to face, they form slots $y\,y$, in which the blades rest and by which they are held. Each blade is made with two branching teeth $z\,z$, of curved form, and the ends are bent laterally to the desired degree to produce the necessary digging and turning action in the soil. This construction of the blades is such that the shank portion $v$ is of large extent, resting flatwise between the disks and giving great strength.

Having described my invention, what I claim as new, and desire to secure by Letters Patent, is—

1. In a spading-harrow, the combination with the draft-pole and the two gangs of teeth, of the front bars C, C, attached at one end to standards connected with the gangs, and pivoted at the other end to the pole, the seat-support E pivoted to the pole, and the arms G, G, connecting the front bars with the seat-support, as shown and described and for the purpose set forth.

2. In a spading-harrow, the combination with the cutting-teeth-carrying frames C, C, hinged to the opposite sides of the pole B, of a seat mounted between the said frames upon the outer end of the bar E, which is pivoted to the pole, and which is supported by diagonal bars G, G, the outer ends of which are pivoted to the inner ends of the cutting-teeth-carrying frames, the inner ends being pivoted to a vertical guide-bar J, the lower end of which is adapted to slide freely through a guide-socket located at the rear of the pole, the said vertical rod carrying at its upper end a pivoted bifurcated support $j$, through the bifurcation of which passes the seat-supporting rod E, all combining to operate substantially as described.

3. In a spading-harrow, the combination of the frame made in two sections hinged on opposite sides of the pole, the said frame comprising the rods C, C, the inner ends of which are pivoted to the pole, and the outer ends bent rearwardly, being pivoted vertically to the outer pair of vertical standards which carry the axles upon which the cutting-teeth are mounted, the inner pair of vertical standards being connected to the lever which is adapted to adjust the cutting-teeth-carrying axles at the desired angle, of a diagonal seat-support pivoted to the pole, and passing through the bifurcated block $j$, which is pivoted to the upper end of the vertical rod J, which is adapted to slide freely through a guide-socket located at the rear end of the pole, the said seat-support and vertical rod being upheld by two diagonal rods G, G, disposed at opposite sides of the vertical rod, the lower ends of which are pivoted to the inner ends of hinged sections carrying the cutting-teeth, and the inner ends to the vertical rod, substantially as and for the purpose described.

4. The cutting-teeth of the class described comprising the disks L, L, each having the squared central eye $s$, in which fit the squared shoulders of the spools connecting together a series of the said cutting-teeth, and by which the said teeth are clamped together, the inner face of each disk having the sunken seat $u$, and the shoulders $w$, $w$, the said sunken seats $u$ being adapted to receive the shanks of two of the blades of the said cutter, which fill the said sunken seats flush, the edge of the shank of the third blade resting against the shoulders $w$, $w$, the said third shank being clamped between the shanks of the other blades, substantially as described.

In witness whereof I have hereunto signed my name in the presence of two subscribing witnesses.

CHRISTIAN MAUL.

Witnesses:
R. F. OSGOOD,
P. A. COSTICH.